United States Patent Office 3,354,457
Patented Nov. 21, 1967

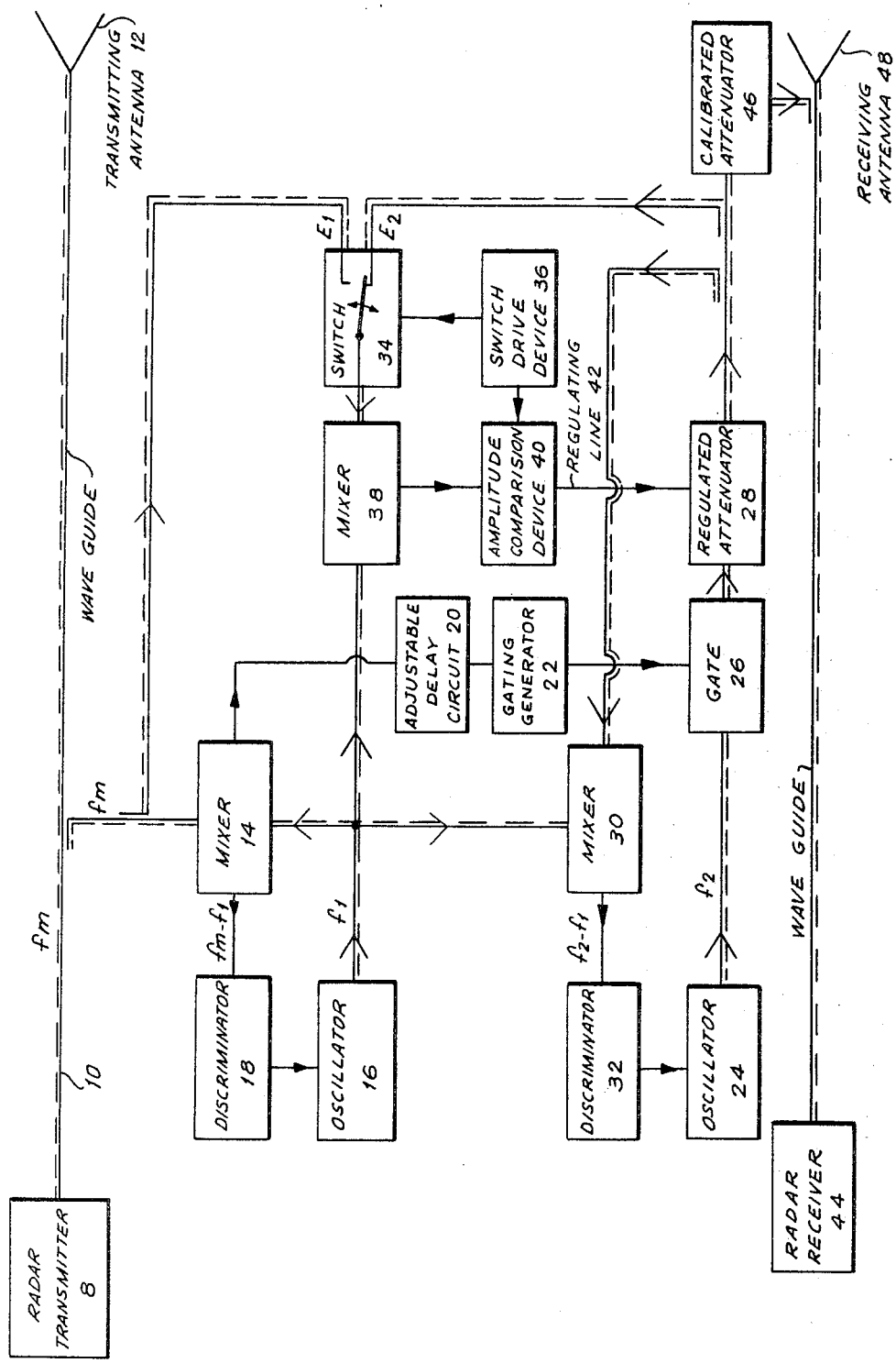

3,354,457
METHOD AND DEVICE FOR THE PRODUCTION OF A RADAR ECHO
Diethard G. Pfab, Munich, Germany, and Helmut A. Schwab, Dahlgren, Va., assignors to Eltro G.m.b.H. & Co., Heidelberg, Germany
Filed July 21, 1966, Ser. No. 566,807
Claims priority, application Germany, July 22, 1965, E 29,755
8 Claims. (Cl. 343—17.7)

ABSTRACT OF THE DISCLOSURE

In radar signal transmitting and receiving arrangement, a shunt is provided between the transmitter and receiver to shunt a portion of the transmitted energy directly from the transmitter to the receiver with a determinable time delay in the form of a signal having a duration and carrier frequency corresponding to that of the transmitted signal.

---

This invention relates to the producing of standard echoes for radar apparatus.

Standard echoes are needed for checking the operation of radar equipment and, in particular, for the calibration thereof. Apparatus producing standard echoes can also be used for the measurement of reflection surfaces of radar targets.

Methods are known for producing such standard echoes for radar equipment. This is done chiefly by using special reflectors. However, such reflectors when operated as standard echo producers exhibit some defects which are intolerable for accurate measurements. For example, due to various environmental influences, reflectors may greatly change their reflection behavior in the course of time. Moreover, in measurements with reflectors, interference phenomena difficult to observe often occur which may falsify the measurement results.

In addition, pure distance standards are known. In such techniques, a portion of the energy emitted is intercepted in a special device, the distance standard, is delayed and returned to the radar receiving antenna and radar installation. On the screen of the radar equipment, the echo of a far distant, apparent reflection body then becomes visible. From the known delay time of the distance standard, the apparent distance of the sham target produced by the distance standard can be calculated. By this method, the distance indicated of the radar equipment can be exactly calibrated. An amplitude comparison of the reflected energy of a real radar target with the energy furnished by the distance standard cannot logically be made for calibrating purposes as the distance standard does not, at the same time, constitute an amplitude standard.

The problem underlying the invention is to develop a method for making available in radar equipment, at any time, echo standard pulses with which the echo pulses of any desired targets can be compared. These pulses are therefore pulses which are standard pulses with respect to their amplitude and are comparable with the echo pulses of reflectors. The disadvantages of reflectors as standard echo producers are, however, to be avoided.

The method according to the invention is based on a principle whereby a defined, small portion of the radar transmitting energy is shunted from the antenna or its feed line to a special device hereafter called the reflection standard.

A defined time after the arrival of each radar pulse at the reflection standard, the latter furnishes a standard pulse to the radar equipment. The standard pulse is passed onto the radar equipment via the antenna feed line or via the receiving antenna. The standard pulse furnished by the reflection standard has the following properties: the carrier frequency of the standard pulse is equal to the carrier frequency of the radar pulse, its amplitude is an adjustable, defined portion of the radar pulse amplitude, and the duration of the standard pulse is variable. The time interval between each radar pulse and the respective standard pulse can also be varied.

On a radar screen, when the radar eqipment is used as target radar equipment, the standard pulse appears as an ordinary echo pulse. By comparison of the standard pulse with a certain echo pulse, observations can be made, for example, about the reflection surface of the body producing the echo pulse.

To facilitate an understanding of this invention, a preferred embodiment thereof will next be explained in greater detail with reference to the annexed drawing in which the sole figure shows in block diagram a device that can be used for carrying out the aforesaid method.

In connection with the illustrated apparatus, the carrier frequency of the radar pulses will be assumed to be $f_m$. A defined fraction of the radar transmitting energy generated in transmitter 8 is coupled out of the transmitting antenna feed line or wave guide 10 or from the transmitting antenna 12 and is supplied to a mixer 14. An oscillator 16 having a frequency $f_1$, operating as a heterodyne oscillator, is connected with mixer 14. The intermediate frequency $f_m - f_1$ which results is tested by a discriminator 18 for deviation from a fixed value $f_{ZF_0}$. If $f_m - f_1$ differs from the frequency $f_{ZF_0}$, oscillator 16 is readjusted so that any deviation from the value $f_{ZF_0}$ cancels out.

From the radar transmitting pulse, a trigger pulse is derived. The latter pulses a delay circuit 20 which, an adjustable time after the arrival of a radar pulse, excites a gating generator 22 for the formation of a gating pulse. With this gating pulse, the output of an oscillator 24 connected to a microwave gate circuit 26 is gated. The duration of the gating pulse can be varied, or it can be automatically adjusted to the same value as the radar pulse duration. In case of gating, the oscillaor 24 oscillates continuously at frequency $f_2$ and, when a gate circuit 26 is used, the energy of oscillator 24 passes through the gate circuit 26 only during the gating time of gate circuit 26. The signal of the oscillator 24 subsequently passes through a regulated attenuator 28. A portion of the energy is branched off and supplied to a mixer 30. Oscillator 16 operates as heterodyne oscillator for mixer 30. The resulting intermediate frequency is tested by a discriminator 32 for coincidence with the value $f_{ZF_0}$. If the intermediate frequency $f_{ZF_0}$ differs, oscillators 24 is adjusted so that the deviation becomes zero. Thereby, it is achieved that $f_2 = f_m$; that is, the frequency of oscillator 24 is equal to the carrier frequency of the radar pulse.

A portion of the radar pulse energy E1 and an approximately equal portion E2 of the gated energy of the oscillator 24 are supplied to a switch 34. This switch, controlled by the switch drive device 36, connects E1 and then E2 to mixer 38. The amplitude comparison device 40 responds to differences between E1 and E2.

Through a control line 42 the regulated attenuator 28 is now adjusted so that E1 and E2 have equal amplitude. With that, the amplitude of the standard pulse finally fed into the radar receiver 44 is a defined fraction of the radar pulse amplitude. A calibrated attenuator 46 permits a further division as desired of the standard pulse fed into the radar receiver to which is connected receiving antenna 48. The amplitude of the standard pulse is thus given by fixed, invariable dividers, for example, directional couplers, by an amplitude comparison circuit, and by a calibrated divider.

What is claimed is:
1. A method for producing a standard echo in radar apparatus which comprises a transmitter and receiver relative to which the transmitter generates an energy pulse which is characterized by a determinable carrier frequency and duration and which is transmitted through space and reflected by a target back to said receiver, said method comprising shunting a portion of the energy pulse from the transmitter to said receiver thereby bypassing said space and target, with a determinable time delay and with a carrier frequency and duration equal to that of said pulse, and with a defined and determinable amplitude ratio between the shunted and transmitted portions of the pulse.

2. For use with a radar transmitter and receiver which transmit and receive pulses characterized by carrier frequency and duration, an echo pulse generator comprising means responsive to pulses generated by the transmitter to generate corresponding pulses of like carrier frequency and duration, means to regulate the amplitude of said corresponding pulses in correspondence with the amplitude of the pulses generated by said transmitter, and means to couple the thusly regulated corresponding pulses to said receiver.

3. An echo pulse generator as claimed in claim 2 wherein the latter said means comprises attenuator means to attenuate said corresponding pulses before the latter are coupled to said receiver.

4. An echo pulse generator as claimed in claim 3 comprising means to delay said corresponding pulses relative to the pulses to which they correspond.

5. An echo pulse generator as claimed in claim 2 wherein said attenuator means comprises means to compare the amplitudes of the pulses generated by the transmitter and said corresponding pulses and to adjust the amplitude of said corresponding pulses to a predetermined ratio relative to the pulses to which they correspond.

6. An echo pulse generator as claimed in claim 5 wherein the first said means includes oscillator means for generating said corresponding pulses with the corresponding carrier frequency, gating means between said receiver and oscillator means, and adjustable delay means responsive to pulses generated by the transmitter to apply delayed gating signals to said gating means.

7. An echo pulse generator as claimed in claim 6 wherein the first said means includes two oscillators, mixers and discriminators, one of said mixers being coupled to said transmitter and one of said oscillators and mixing the signals thereof to generate the beat frequency, one of said discriminators being coupled to said one mixer to compare said beat frequency with a standard for the adjustment of said one oscillator, the other of said mixers being coupled to both said oscillators to generate a second beat frequency, the other of said discriminators comparing the second beat frequency with said standard for the adjustment of the other of said oscillators.

8. An echo pulse generator as claimed in claim 6 comprising a calibrated attenuator between said gating means and receiver.

No references cited.

RODNEY D. BENNETT, *Examiner.*

T. H. TUBBESING, *Assistant Examiner.*